United States Patent
Huang

(10) Patent No.: US 11,940,906 B2
(45) Date of Patent: Mar. 26, 2024

(54) METHOD FOR MODIFYING BASIC INPUT/OUTPUT SYSTEM OF SERVER

(71) Applicant: Mitac Computing Technology Corporation, Taoyuan (TW)

(72) Inventor: Chia-Jen Huang, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 248 days.

(21) Appl. No.: 17/645,128

(22) Filed: Dec. 20, 2021

(65) Prior Publication Data

US 2022/0197785 A1 Jun. 23, 2022

(30) Foreign Application Priority Data

Dec. 23, 2020 (TW) .................................. 109145663

(51) Int. Cl.
*G06F 11/36* (2006.01)
*G06F 9/4401* (2018.01)
*G06F 21/31* (2013.01)

(52) U.S. Cl.
CPC ........ *G06F 11/3692* (2013.01); *G06F 9/4406* (2013.01); *G06F 11/3684* (2013.01); *G06F 11/3688* (2013.01); *G06F 11/3696* (2013.01); *G06F 21/31* (2013.01)

(58) Field of Classification Search
CPC ............... G06F 9/4406; G06F 11/3692; G06F 11/3684; G06F 11/3688; G06F 11/3696; G06F 21/31
See application file for complete search history.

(56) References Cited

U.S. PATENT DOCUMENTS

| | | | | |
|---|---|---|---|---|
| 7,289,108 B2* | 10/2007 | Kuo | ...................... | G06F 3/0238 710/10 |
| 9,430,246 B2* | 8/2016 | Park | ...................... | G06F 9/4401 |
| 10,404,538 B1 | 9/2019 | Righi et al. | | |
| 11,704,198 B2* | 7/2023 | Pathan | ................ | G06F 11/1417 714/2 |
| 2007/0204144 A1* | 8/2007 | Gafken | ..................... | G06F 8/65 713/2 |
| 2008/0256351 A1* | 10/2008 | Natarajan | ........... | G06F 11/2284 714/36 |

(Continued)

FOREIGN PATENT DOCUMENTS

| | | |
|---|---|---|
| TW | 201610850 A | 3/2016 |
| TW | 201729123 A | 8/2017 |

OTHER PUBLICATIONS

Search Report appended to an Office Action, which was issued to Taiwanese counterpart application No. 109145663 by the TIPO dated Oct. 7, 2021, with an English translation thereof.

*Primary Examiner* — Douglas M Slachta
(74) *Attorney, Agent, or Firm* — MLO, a professional corp.

(57) ABSTRACT

A method to be implemented by the server includes steps of: during a power-on self-test, determining whether a storage device is communicatively connected to the server; when it is determined that a storage device is communicatively connected to the server, determining whether the storage device stores a script file having a preset filename; and when it is determined that the storage device stores a script file having the preset filename, performing a process of modifying the BIOS based on the script file.

12 Claims, 3 Drawing Sheets

(56) References Cited

U.S. PATENT DOCUMENTS

| | | | | |
|---|---|---|---|---|
| 2009/0091538 | A1* | 4/2009 | Lan | G06F 3/023 |
| | | | | 345/172 |
| 2009/0300343 | A1* | 12/2009 | Lan | G06F 9/44505 |
| | | | | 713/2 |
| 2010/0106867 | A1* | 4/2010 | Ghorakavi | G06F 13/102 |
| | | | | 710/33 |
| 2014/0317393 | A1* | 10/2014 | Wu | G06F 1/26 |
| | | | | 713/2 |
| 2018/0321947 | A1* | 11/2018 | Liu | G06F 9/4401 |
| 2019/0079776 | A1* | 3/2019 | Okayasu | G06F 9/4401 |
| 2019/0121981 | A1* | 4/2019 | Fu | G06F 9/4401 |
| 2021/0255872 | A1* | 8/2021 | Samuel | G06F 21/572 |
| 2021/0334111 | A1* | 10/2021 | Limonciello | G06F 9/4406 |

* cited by examiner

METHOD FOR MODIFYING BASIC INPUT/OUTPUT SYSTEM OF SERVER

CROSS-REFERENCE TO RELATED APPLICATION

This application claims priority of Taiwanese Invention Patent Application No. 109145663, filed on Dec. 23, 2020.

FIELD

The disclosure relates to a method for modifying basic input/output system of a server.

BACKGROUND

During development of a computing system (e.g., a server), different versions of configuration settings of a basic input/output system (BIOS) of the computing system have to be tested. To test each version of the configuration settings of the BIOS, a cycle test is performed; that is to say, each version of the configuration settings of the BIOS may be tested independently several times. Conventionally, the different versions of configuration settings of BIOS are respectively prepared by manually modifying BIOS program codes. However, such approach is time consuming and tedious, and is prone to error when complex configuration settings (e.g., configuration settings for Intel® Optane™ DC Persistent Memory, DCPMM)) are involved.

SUMMARY

Therefore, an object of the disclosure is to provide a method to be performed by a server in relation to a basic input/output system (BIOS) that can alleviate at least one of the drawbacks of the prior art.

According to the disclosure, the method includes steps, to be implemented by the server, of:
  during a power-on self-test, determining whether a storage device is communicatively connected to the server;
  when it is determined that a storage device is communicatively connected to the server, determining whether the storage device stores a script file having a preset filename; and
  when it is determined that the storage device stores a script file having the preset filename, performing a process of modifying the BIOS based on the script file.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
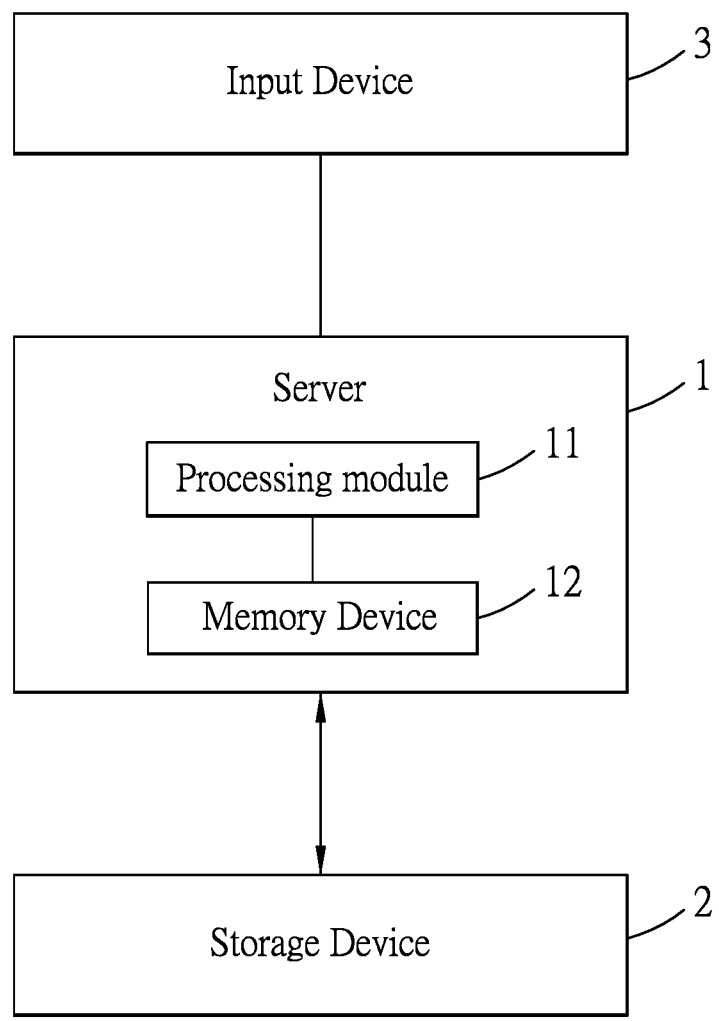
FIG. 1 is a block diagram illustrating an example of a server according to an embodiment of the disclosure.
Figure 2:
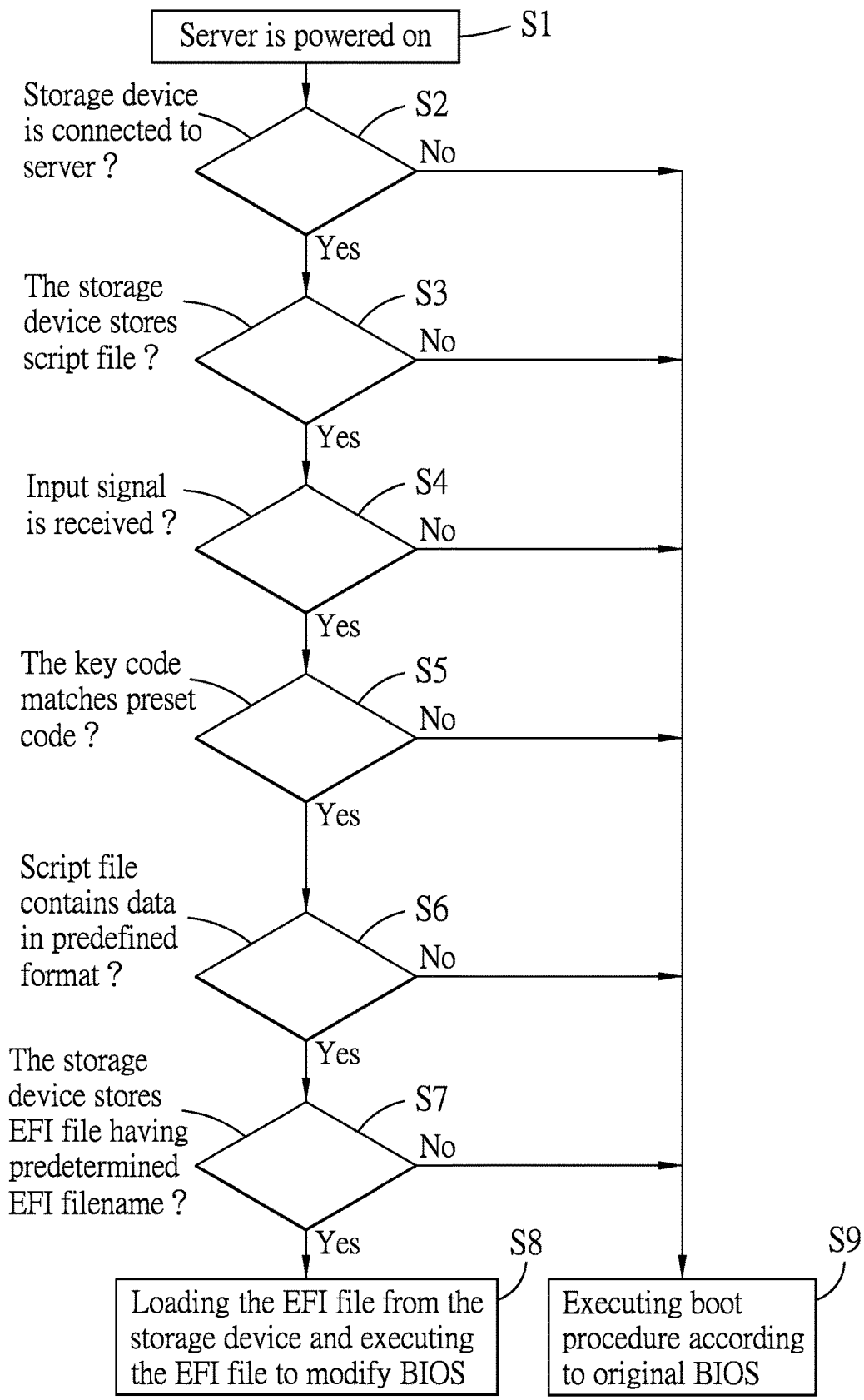
FIG. 2 is a flow chart illustrating a method according to an embodiment of the disclosure.

Referring to FIGS. 1 and 2, an embodiment of a method to be implemented by a server 1 in relation to a basic input/output system (BIOS) of the server 1 according to the disclosure is illustrated.

The server 1 may be implemented by a computing server or a data server, but is not limited thereto. The server 1 includes a processing module 11 and a memory device 12. The processing module 11 is configured to implement functionalities discussed in this disclosure. The memory device 12 is electrically connected to the processing module 11, and includes volatile memory (e.g., dual in-line memory module (DIMM) memory) and non-volatile memory (e.g., flash memory) that stores the BIOS of the server 1. Specifically, the non-volatile memory storing the BIOS is also known as a BIOS chip. When the server 1 is powered on, the BIOS is loaded from the BIOS chip into the volatile memory so that the processing module 11 can access the volatile memory to execute the BIOS temporarily stored therein.

In this embodiment, the sever 1 is electrically connected to an input device 3. For example, the input device 3 is a keyboard, and includes at least one hot key (e.g., a physical button on the keyboard). The input device 3 is configured to send a hot-key signal to the processing module 11 of the server 1 upon the hot key being pressed. It should be noted that in other embodiments, the hot key may be implemented by a physical button disposed on a case of the server, or may be implemented by a virtual button on a touchscreen disposed on the case of the server. Alternatively, the input device 3 may be an external device (e.g., a notebook computer or a desktop computer) that includes a keyboard or a touch panel and that is configured to send the hot-key signal to the processing module 11 of the server 1.

The server 1 is adapted to be electrically connected to a storage device 2. For example, the storage device 2 is an external storage device and is implemented to be a Universal Serial Bus (USB) flash drive, and the storage device 2 and the server 1 are physically connected to each other via a USB connection between a USB plug provided on the storage device 2 and a USB port provided on the server 1, so as to enable the processing module 11 of the server 1 to communicate with the storage device 2 under USB standards. Herein, the USB flash drive serves as a USB key. However, implementation of the storage device 2 is not limited to the disclosure herein and may vary in other embodiments. For example, the storage device 2 may be implemented by a hard disk drive (HDD), a solid state disk (SSD), electrically-erasable programmable read-only memory (EEPROM) or any other non-volatile memory devices. The server 1 may be connected, via a network connection, to the storage device 2 that is remote from the server 1 and that serves as a virtual device of the server 1.

In one embodiment, the processing module 11 includes a central processing unit (CPU) and a platform controller hub (PCH) that are electrically connected to each other. The CPU is electrically connected to the volatile memory (e.g., DIMM memory), and is electrically connected via the PCH to the storage device 2 and the BIOS chip. It is worth to note that the CPU and the PCH may be respectively implemented by two separate chips, or may be implemented to be integrated into a single chip (e.g., a system on a chip, SOC).

Referring to FIG. 2, the method includes steps S1 to S9 delineated below.

In step S1, the server 1 is powered on.

In step S2, the processing module 11 of the server 1 loads BIOS program codes so as to execute a boot procedure. During a power-on self-test of the boot procedure, the processing module 11 determines whether a storage device (e.g., the storage device 2) is communicatively connected to the server 1. When it is determined that the storage device 2 is communicatively connected to the server 1, a procedure flow of the method proceeds to step S3. Otherwise, the procedure flow proceeds to step S9.

In step S3, the processing module 11 determines whether the storage device 2 stores a script file having a preset filename. The preset filename is for example "Automatization_Feature.txt", but is not limited thereto. When it is determined that the storage device 2 stores a script file having the preset filename, the procedure flow proceeds to performing a process of modifying the BIOS based on the script file. Otherwise, the procedure flow proceeds to step S9.

In the process of modifying the BIOS, the processing module 11 first determines whether the hot-key signal is received. When it is determined that the hot-key signal is received, the processing module 11 continues to modify the BIOS based on the script file according to the hot-key signal.

Specifically, determining whether the hot-key signal is received includes steps S4 and S5. In step S4, the processing module 11 determines whether an input signal is received from the input device 3. When it is determined that an input signal is received from the input device 3, the procedure flow proceeds to step S5. Otherwise, the procedure flow proceeds to step S9. In some embodiments, the processing module 11 determines whether an input signal is received from the input device 3 within a predetermined time period (e.g., 1 second).

Upon receiving an input signal from the input device 3, the processing module 11 determines, in step S5, whether a key code contained in the input signal matches a preset code that corresponds to the hot key, and determines that the hot-key signal is received when the key code matches the preset code. When it is determined that the key code matches the preset code and that the hot-key signal is received, the procedure flow proceeds to step S6. Otherwise, the procedure flow proceeds to step S9.

It is worth to note that the server 1 is currently in a state called "ready to boot phase" before booting of an operating system (OS) of the server 1. The key code may correspond to any key on the keyboard (e.g., an alphabetical key, a numeric key, a punctuation key, a modifier key, a function key, etc.). For example, the key code may be "001", "010", "011", etc., and the key codes "001", "010" and "011" would be interpreted by the processing module 11 respectively as characters "A", "B" and "C". However, implementations of the key codes and interpretation of the key codes are not limited to the disclosure herein. It should be noted that the processing module 11 may sequentially receive a series of input signals that contain arbitrary combinations of the key codes, and interpret the arbitrary combinations of the key codes together as a set of keys such as "HotkeyA", "HotkeyB" and "HotkeyC". In this case, the preset code may represent a set of specific keys so as to be compared with a combinations of the key codes.

It is worth to note that the preset code may be acquired by the processing module 11 by referring to parameters coded in the program codes of the BIOS, or setting value(s) stored in the memory device 12.

In step S6, the processing module 11 determines whether the script file contains data in a predefined format. When it is determined that the script file contains data in the predefined format, the procedure flow proceeds to modifying the BIOS based on the script file according to the hot-key signal. Otherwise, the procedure flow proceeds to step S9. The predefine format exemplarily includes a pair of lines with a first line starting with the symbol "#" and a second line ending with ".efi". Specifically, each pair of lines has an upper line (the first line) indicating the hot key, and a lower line (the second line) indicating an extensible firmware interface (EFI) filename.

An example of data in the script file which complies with the predefined format is shown below.

HotkeyA_Create_APP_Direct_mode
Creat_APP_Direct_mode.efi
HotkeyB_Create_MEM_mode
Create_MEM_mode.efi
HotkeyC_Auto_Create_DCPMM_Namespace
Create_DCPMM_Namespace.efi For instance, for the first pair of lines shown above, the upper line "HotkeyA_Create_APP_Direct_mode" indicates the hot key "A", and the lower line indicates a predetermined EFI filename of "Creat_APP_Direct_mode.efi". Similarly, for the second pair of lines, the upper line "HotkeyB_Create_MEM_mode" indicates the hot key "B", and the lower line indicates a predetermined EFI filename "Create_MEM_mode.efi"; and for the third pair of lines, the upper line "HotkeyC_Auto_Create_DCPMM_Namespace" indicates the hot key "C", and the lower line indicates a predetermined EFI filename "Create_DCPMM_Namespace.efi".

Specifically, modifying the BIOS based on the script file according to the hot-key signal includes steps S7 and S8. In order to modify the BIOS based on an EFI file having the predetermined EFI filename, in step S7, the processing module 11 searches the script file for the predetermined EFI filename that is associated with the hot-key signal (i.e., the predetermined EFI filename in the lower line of one pair of lines whose upper line indicates the hot key that corresponds to the key code contained in the hot-key signal), and determines whether the storage device 2 stores an EFI file that has the predetermined EFI filename. When it is determined that the storage device 2 stores an EFI file having the predetermined EFI filename, the procedure flow proceeds to step S8. Otherwise, the procedure flow proceeds to step S9.

In step S8, the processing module 11 loads the EFI file from the storage device 2, and executes the EFI file to modify the BIOS. The modifying of the BIOS includes one of modifying configuration of the BIOS, adding an additional program code to an original program code of the BIOS, replacing a part of the original program code of the BIOS with a replacement program code, and setting parameters of a hardware of the server 1 in the BIOS.

For example, when it is determined in step S5 that the key code contained in the input signal matches the preset code that corresponds to the hot key "A" (i.e., the key "A" has been pressed), the processing module 11 will load from the storage device 2 the EFI file "Creat_APP_Direct_mode.efi" which is indicated in the lower line of the first pair the upper line of which indicates the hot key "A", and then execute the EFI file "Creat_APP_Direct_mode.efi" to modify the BIOS (step S8). Similarly, when the hot key "B" is pressed, the processing module 11 will load from the storage device 2 the EFI file "Create_MEM_mode.efi" and then execute the EFI file "Create_MEM_mode.efi" to modify the BIOS (step S8).

In one embodiment, the processing module 11 of the server 1 determines whether the storage device 2 stores an EFI file that has the predetermined EFI filename, and loads the EFI file from the storage device 2 when it is determined that the storage device 2 stores an EFI file having the predetermined EFI filename. Then, the processing module 11 incorporates data associated with the EFI file into the BIOS to result in a modified version of the BIOS, and stores the modified version of the BIOS only in the volatile memory. Herein, the data associated with the EFI file may be program codes that are to be added to the original program code of the BIOS, or parameters that are to be referred to by the processing module 11 when the processing module 11 is executing the boot procedure based on the EFI file. Subsequently, the processing module 11 boots the server 1 based on the modified version of the BIOS stored in the volatile memory.

In one embodiment, the processing module 11 of the server 1 determines whether the storage device 2 stores an EFI file that has the predetermined EFI filename, and loads the EFI file from the storage device 2 when it is determined that the storage device 2 stores an EFI file having the predetermined EFI filename. Then, the processing module 11 incorporates the data associated with the EFI file into the BIOS to result in a modified version of the BIOS, and stores the modified version of the BIOS in both the volatile memory and the non-volatile memory.

In some embodiments, the EFI file includes position data indicating a specific position in the original program code of the BIOS, and the processing module 11 adds the data to the original program code of the BIOS at the specific position according to the position data.

It is worth to note that storage of the modified version of the BIOS in the volatile memory is referred to as temporary storage (i.e., the data associated with the EFI file should be temporarily incorporated into the BIOS), and storage of the modified version of the BIOS in the non-volatile memory is referred to as permanent storage (i.e., the data associated with the EFI file should be permanently incorporated into the BIOS). For the permanent storage, the processing module 11 will execute the boot procedure according to the modified version of the BIOS whenever the server 1 boots (i.e., when the server 1 reboots or when the server 1 boots in the current boot procedure). For the temporary storage, the processing module 11 executes the boot procedure according to the modified version of the BIOS only in the current boot procedure, and the processing module 11 will execute the boot procedure according to an original version of the BIOS (i.e., the BIOS that does not contain the data associated with the EFI file) when the server 1 reboots because the BIOS stored in the non-volatile memory is unmodified.

In step S9, instead of modifying the BIOS based on the EFI file, the processing module 11 continues executing the boot procedure according to original settings of the BIOS. It should be noted that, in step S9, the BIOS is not modified.

Figure 3:
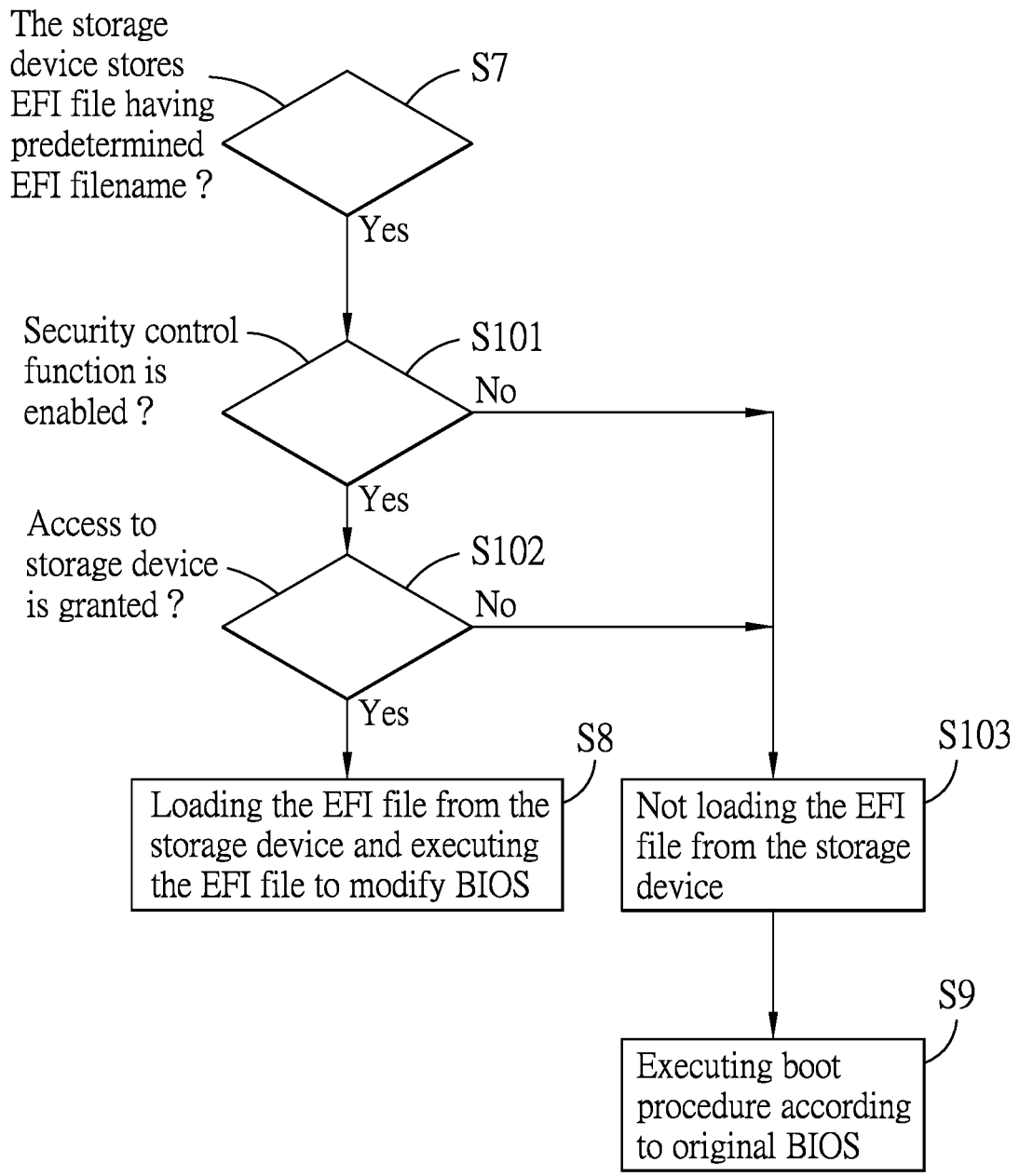
FIG. 3 is a flow chart illustrating the method according to an embodiment of the disclosure.

Referring to FIG. 3, in some embodiments of the method, before loading the EFI file from the storage device 2 in step 38, the method further includes a step 3101, in which the processing module 11 further determines whether a security control function is enabled when it is determined in step S7 that the storage device 2 stores an EFI file having the predetermined EFI filename. The processing module 11 does not load the EFI file from the storage device 2 (step S103) when it is determined that the security control function is not enabled. On the other hand, when it is determined that the security control function is enabled, the processing module 11 determines whether access to the storage device 2 is granted (step S102). After step S103, the processing module 11 implements step S9 of executing the boot procedure according to the original settings of the BIOS.

More specifically, in step S102, the processing module 11 determines whether an input password matches a preset password. The input password is inputted by a user using, for example, the input device 3, and the preset password is an administrator password. The processing module 11 determines that access to the storage device 2 is granted when it is determined that the input password matches the preset password. Oppositely, the processing module 11 determines that access to the storage device 2 is not granted when it is determined that the input password does not match the preset password and that a failed match, meaning that the input password does not match the preset password, has occurred for a preset number of times (e.g., three times).

The processing module 11 implements step S8 of loading the EFI file from the storage device 2 and executing the EFI file to modify the BIOS when it is determined that access to the storage device 2 is granted. Contrarily, when it is determined that access to the storage device 2 is not granted, the processing module 11 does not load the EFI file from the storage device 2 (step S103), and then executes the boot procedure according to the original settings of the BIOS (step S9).

To sum up, in the method according to the disclosure, the storage device 2 that stores the script file and the EFI files in advance is connected to the server 1 so as to enable the server 1 to, in response to the hot-key signal, automatically perform the process of modifying the BIOS during booting based on the script file and the EFI files. In this way, modifying the BIOS of the server 1 may be facilitated, enhancing convenience and flexibility of modifying the BIOS in either a temporary way (i.e., storing the modified version of the BIOS in the volatile memory) or a permanent way (i.e., storing the modified version of the BIOS in the non-volatile memory).

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method to be implemented by a server, the server being electrically connected to an input device that includes at least one hot key and that is configured to send a hot-key signal to the server upon the hot key being pressed, the method comprising steps of:

during a power-on self-test, determining whether a storage device is communicatively connected to the server;

when it is determined that a storage device is communicatively connected to the server, determining whether the storage device stores a script file having a preset filename; and when it is determined that the storage device stores a script file having the preset filename, performing a process of modifying a basic input/output system (BIOS) of the server the BIOS based on the script file,
wherein the step of performing a process of modifying the BIOS includes sub-steps of:
determining whether the hot-key signal is received; and
when it is determined that the hot-key signal is received, modifying the BIOS based on the script file according to the hot-key signal,
wherein the sub-step of modifying the BIOS based on the script file according to the hot-key signal includes sub-steps of:
searching the script file for a predetermined extensible firmware interface (EFI) filename that is associated with the hot-key signal; and
modifying the BIOS based on an EFI file having the predetermined EFI filename.

2. The method as claimed in claim 1, wherein the sub-step of determining whether the hot-key signal is received includes sub-steps of:
determining whether an input signal is received from the input device;
upon receiving an input signal from the input device, determining whether a key code contained in the input signal matches a preset code that corresponds to the hot key; and
determining that the hot-key signal is received when the key code matches the preset code.

3. The method as claimed in claim 1, wherein the sub-step of modifying the BIOS based on an EFI file having the predetermined EFI filename includes sub-steps of:
determining whether the storage device stores an EFI file that has the predetermined EFI filename;
loading the EFI file from the storage device when it is determined that the storage device stores an EFI file having the predetermined EFI filename; and
executing the EFI file to modify the BIOS.

4. The method as claimed in claim 3, wherein the sub-step of modifying the BIOS based on an EFI file having the predetermined EFI filename further includes, before the sub-step of loading the EFI file from the storage device, sub-steps of:
determining whether a security control function is enabled when it is determined that the storage device stores an EFI file having the predetermined EFI filename;
when it is determined that the security control function is enabled, determining whether access to the storage device is granted; and
implementing the sub-step of loading the EFI file from the storage device when it is determined that access to the storage device is granted.

5. The method as claimed in claim 4, wherein the sub-step of determining whether access to the storage device is granted includes:
determining whether an input password matches a preset password; and
determining that access to the storage device is granted when it is determined that the input password matches the preset password.

6. The method as claimed in claim 4, wherein the sub-step of determining whether access to the storage device is granted includes:
determining whether an input password matches a preset password; and
determining that access to the storage device is not granted when it is determined that the input password does not match the preset password and that a failed match, meaning that the input password does not match the preset password, has occurred for a preset number of times,
wherein, when it is determined that access to the storage device is not granted, the sub-step of loading the EFI file from the storage device is not implemented.

7. The method as claimed in claim 3, wherein the sub-step of modifying the BIOS based on an EFI file having the predetermined EFI filename further includes, before the sub-step of loading the EFI file from the storage device, sub-steps of:
determining whether a security control function is enabled when it is determined that the storage device stores the EFI file having the predetermined EFI filename; and
not loading the EFI file from the storage device when it is determined that the security control function is not enabled.

8. The method as claimed in claim 1, the server including volatile memory, wherein the sub-step of modifying the BIOS based on an EFI file having the predetermined EFI filename includes:
determining whether the storage device stores an EFI file that has the predetermined EFI filename;
loading the EFI file from the storage device when it is determined that the storage device stores an EFI file having the predetermined EFI filename;
incorporating data associated with the EFI file into the BIOS to result in a modified version of the BIOS; and
storing the modified version of the BIOS only in the volatile memory.

9. The method as claimed in claim 8, further comprising:
booting the server based on the modified version of the BIOS stored in the volatile memory.

10. The method as claimed in claim 1, the server including volatile memory and non-volatile memory that stores the BIOS, wherein the sub-step of modifying the BIOS based on an EFI file having the predetermined EFI filename includes:
determining whether the storage device stores an EFI file that has the predetermined EFI filename;
loading the EFI file from the storage device when it is determined that the storage device stores an EFI file having the predetermined EFI filename;
incorporating data associated with the EFI file into the BIOS to result in a modified version of the BIOS; and
storing the modified version of the BIOS in the volatile memory and the non-volatile memory.

11. The method as claimed in claim 10, the EFI file including position data indicating a specific position in an original program code of the BIOS, wherein the sub-step of incorporating data associated with the EFI file into the BIOS includes:
adding the data to original program code of the BIOS at the specific position according to the position data.

12. The method as claimed in claim 1, wherein modifying the BIOS includes one of modifying configuration of the BIOS, adding an additional program code to an original program code of the BIOS, replacing a part of the original program code of the BIOS with a replacement program code, and setting a hardware of the server via the BIOS.

* * * * *